Oct. 1, 1946. J. R. HUNTLEY 2,408,646
MACHINE TOOL
Filed Aug. 2, 1945 2 Sheets-Sheet 2

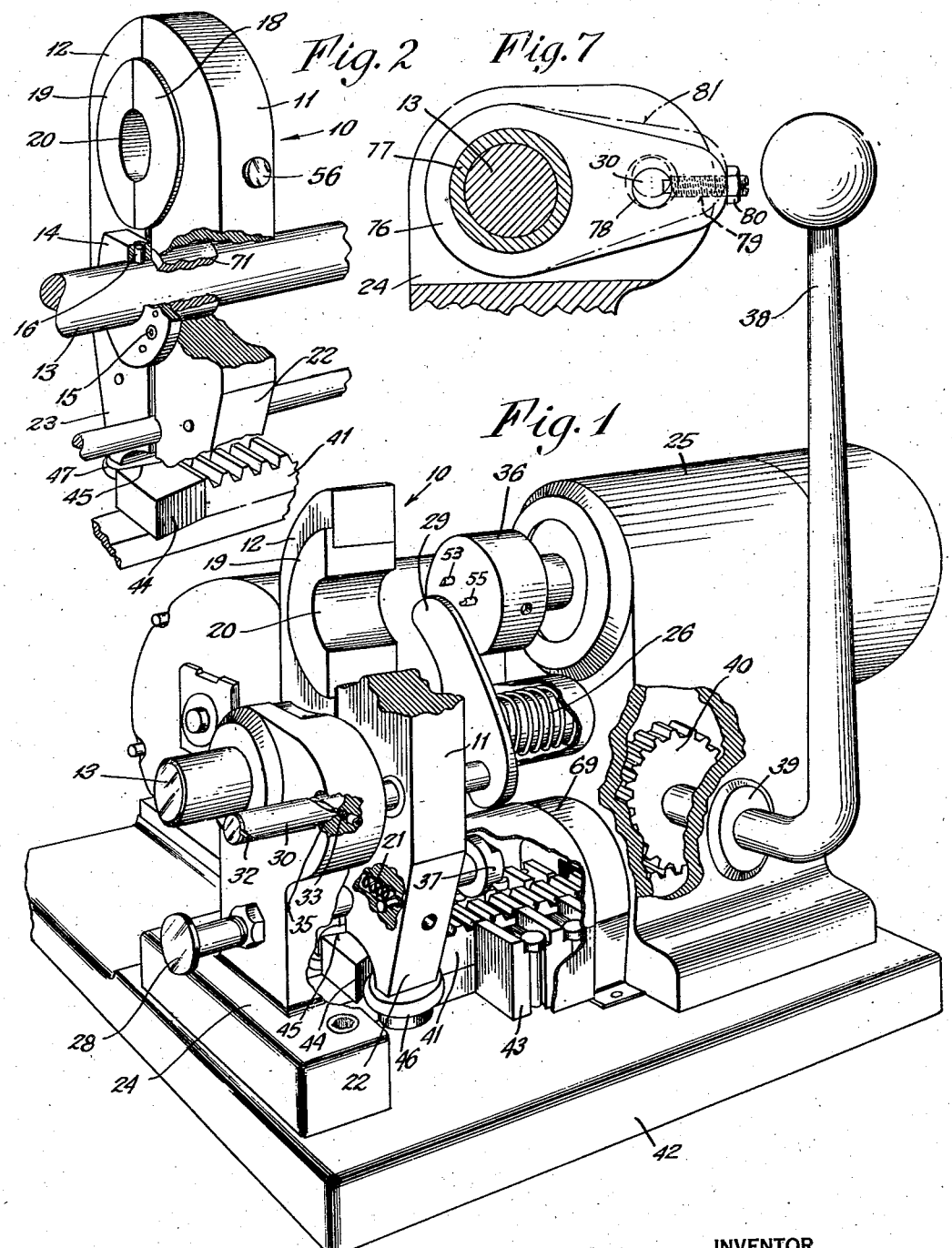

INVENTOR
James R. Huntley
BY Hammond & Littell
ATTORNEYS

Patented Oct. 1, 1946

2,408,646

UNITED STATES PATENT OFFICE 2,408,646

MACHINE TOOL

James R. Huntley, Hicksville, N. Y.

Application August 2, 1945, Serial No. 608,535

11 Claims. (Cl. 90—21)

1

This invention relates to machine tools and particularly a device adapted to trim and/or shape the end of a tube, rod, or similar object.

In the use of tubing in many industries, such as the aircraft industry, tubes must be cut to length and then a bead, flare, or other operation performed thereon requiring the tube to have a trimmed and/or chamfered end. In a cutting operation by an abrasive wheel or a saw when the tube is cut to length, an external and internal burr will be formed on the cut end which is not suitable or desirable in subsequent operation on the tubes such as those mentioned.

One of the objects of the invention is to provide a machine tool which can be used to chamfer, trim, or otherwise operate on the ends of tubes or rods in a simple, quick, and facile manner. When large numbers of tubes must be trimmed in the manufacture of a single item, it is desirable and important to be able to trim the tube ends in the quickest manner possible, and at the same time maintain accurate and smooth surfaces thereon. Another of the objects of the present invention is to provide a means for clamping and operating on an article with a single movement of an operating lever. Another object is to provide a simple work stop for positioning the work correctly in the work clamp each time and which is movable from the end of the work piece as the work is moved into engagement with a tool. It is to be understood that articles other than tubes or rods may be trimmed by the invention described herein. These and other objects will become apparent from the following description and drawings which are merely exemplary.

In the drawings:

Fig. 1 is a perspective view of one embodiment of the invention with portions broken away in order to show the various parts with greater ease.

Fig. 2 is a fragmentary perspective view of the clamping and carriage unit with portions thereof broken away.

Fig. 7 is a fragmentary view, partially in section, of a modified form of a work stop shaft bearing and groove engaging projection in the left-hand support.

There is provided by the present invention a means whereby a tube end, or work to be operated upon, may be clamped, and then moved toward rotating or moving cutting tools for the purpose of trimming and shaping the end of the work. Various types of tools may be used which rotate or move relative to the work, the tools used depending upon the particular operation to be performed. In the form shown, a plurality of tools are adjustably mounted in a rotating head. Means are provided for correctly positioning the tube in the clamp and for limiting movement of the clamped work toward the tool means so as to perform the desired operation. A single operating means or lever is provided for clamping the work and thereafter for moving the clamped work toward the tool a predetermined distance.

Figure 3:
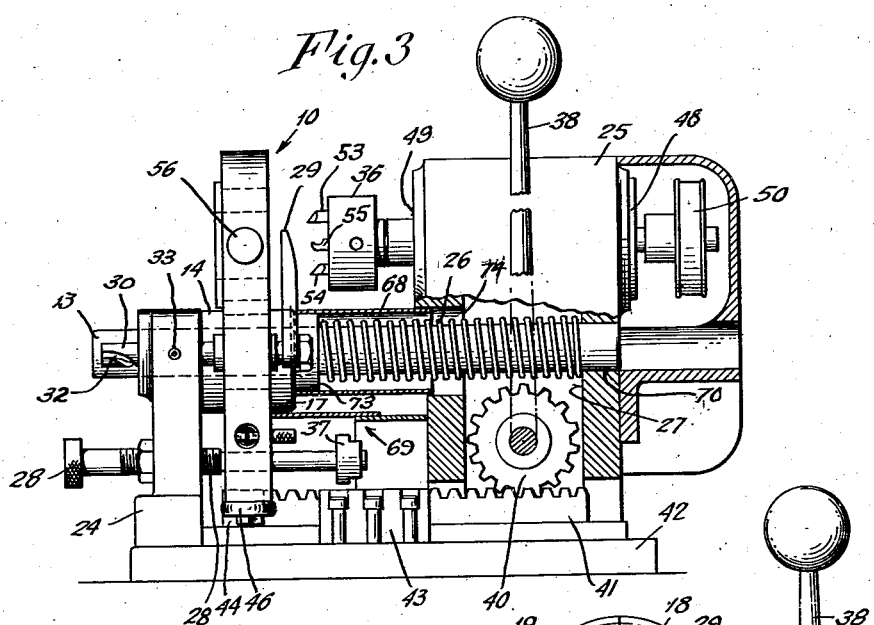
Fig. 3 is an elevation, partially in section, of the machine.

In Fig. 1, a work clamp or carriage unit generally shown at 10 comprises two clamping elements or jaws 11 and 12 which are pivoted on a guide rod or piston 13. Jaw 11 may be supported on guide 13 by means of face plates 14 and 17 fastened on both sides of right hand jaw 11 in any suitable manner such as by screws 15. Work stop or positioner 29 is fixed a predetermined distance from the right hand faces of the jaws so as to locate the end of the work as it is placed within the open jaws by hand, or automatically, a predetermined distance to the right of said jaws. The left-hand end (Figs. 1 and 3) of work stop operating shaft 30 has a helical groove 32 therein which is engageable with a projection 33 mounted in left-hand bearing support 24.

Figure 4:
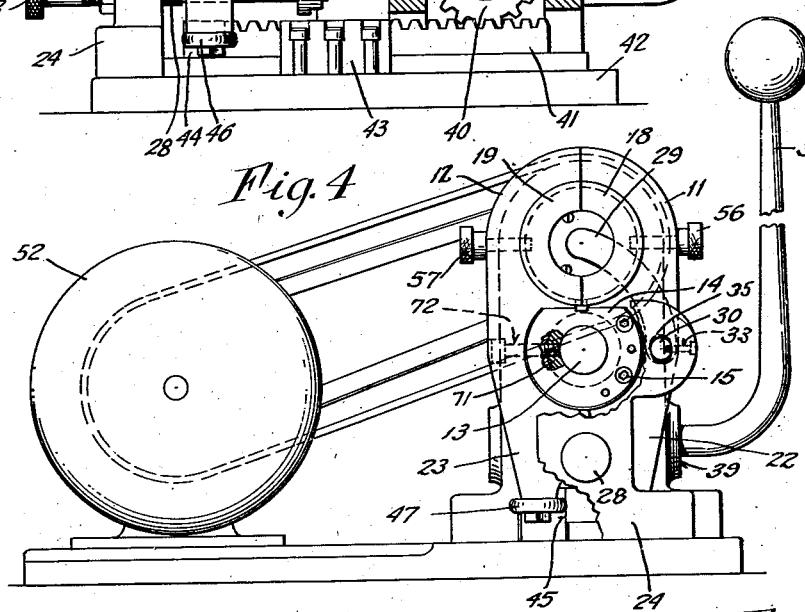
Fig. 4 is an end view looking from the left of Fig. 3 with portions of the left support broken away.

As the carriage 10 is moved to the right, shaft 30 will be withdrawn to the right therewith through elongated hole 35 of the bearing support 24, hole 35 being elongated so as to allow for the pivoting movement of the work clamp. Groove 32 in contact with projection 33 will cause stop 29 to be rotated in a clockwise direction (Figs. 1 and 4) so as to move out of the space between the end of the tube located in the clamp and the tools held in rotating tool holder 36. Shaft 30 is held in bearing 35 from longitudinal movement thereof in any suitable manner and may be adjustable longitudinally. Carriage stop 37 limits the inward movement of the carriage by contact with the face of the clamping carriage 10 so that the work piece is carried a predetermined distance into engagement with the tools held by tool holder 36, said stop 37 being mounted on threaded bolt 28, said bolt being adjustably carried in bearing support 24.

Operating lever 38 is pivoted in bearing 39 in housing 25 and has spur gear 40 mounted on an extension thereof. Spur gear 40 is engageable with rack 41, said rack being slidable on base 42 of the machine and positioned adjustably by means of clamps 43.

At the left-hand end of the rack are located cam surfaces 44 and 45, said surfaces being arranged to contact rollers 46 and 47 mounted on the lower ends of the pivoted jaws 11 and 12 respectively. As the lever 38 is rotated in a counter-clockwise direction (Figs. 1 and 3), rack 41 will be drawn to the right, and cam surfaces 44 and 45 will contact rollers 46 and 47 so as to separate said rollers and cause pivoting of jaws 11 and 12 relative to the center of piston 13 so as to clamp a piece of work which previously has been placed within aperture 20 of the clamping dies 18 and 19. Dies 18 and 19 may be held in place by screws 56 and 57.

The cams or cam may take various forms and may or may not be integral with the rack or operating bar.

After the work is clamped firmly, the rack and cams 44 and 45 will not be able to move further longitudinally relative to the carriage 10 and, when this occurs, further rotation of the operating lever 38 in the same direction will cause carriage 10 to move to the right against the compression of spring 26, piston 13 moving longitudinally through bearing 70 in housing 25. Spring 26 previous to this has opposed movement of the carriage. As the carriage moves to the right, the work stop shaft 30 will be rotated, as previously described, so as to move the work gage or work stop 29 out of the way between the tools and the end of the work. The work is then moved into engagement with the tools held in rotating head 36 and a chamfer, trimming, or other operation performed thereon.

The rotating tool head, for example, may carry inside chamfer tool 53, outside chamfer tool 54, and end facing tool 55. It is to be understood, of course, that various combinations of tools and arrangements thereof may be used to meet the specific purpose for which the machine is to be employed.

Tool head 36 may be carried by a rotatable shaft in bearings 48 and 49, said shaft being rotated by pulley 50 driven by motor 52.

After completion of the trimming, or other operation, operating lever 38 is rotated clockwise, or released, whereupon spring 26 will cause carriage 10 to move away from the rotating tools and be returned toward its original location and the work released as the cams 44 and 45 are moved from between the pivoted jaws. Dowel pin 16 may be provided passing through face plate 14 and a suitable aperture in piston 13. Jaw 12 may have a bushing 71 surrounding piston 13 fastened thereto by screws 72 to serve as the pivot guide for said jaw. The aperture 20 of said combined set of clamping dies is substantially the same, or slightly smaller, than that of the tube to be operated upon to provide proper gripping. Jaws 11 and 12 are normally held in open position by spring 21, said spring serving to urge the lower ends 22 and 23 of the jaws 11 and 12 together thereby separating the split dies 18 and 19 so as to allow the work to be placed or removed. The amount of movement of the clamping elements relative to each other can be small, as low as about 4° having been found to be satisfactory.

One end of piston 13 is carried in bearing support 24 and the other end in housing 25 by a suitable bushing. In the form shown, an opening is provided at 74 slightly larger than chip protector 68 to allow the chip protector to slide within the housing 25. Piston 13 has spring 26 surrounding the same and contacting the wall 27 of housing 25 and the face 73 of bushing 17. This serves to urge the carriage 10 to the left (Fig. 3) and away from housing 25. The movement of the carriage 10 to the left may be limited by contact of bushing 14 with support 24. The piston can be made stationary and the carriage slidable thereon in which case the dowel 16 would be omitted. A telescoping chip protector 69 may be provided.

Instead of providing an elongated hole 35 in the left-hand support 24 to allow for pivoting movement of the clamping jaws, a pivoted arm 76 may be provided in support 24 as shown in Fig. 7, the upper end of support 24 being bifurcated so as to provide a slot for said arm. Arm 76 has a bushing 77 which is oscillatable on guide rod 13. The work stop shaft 30 is carried in aperture 78 at the right-hand end of the arm. There is a projection 79 screw threadedly mounted in said arm for engagement in the groove 32 of the work stop shaft 30. A lock nut 80 may be provided for locking the projection in place. As the jaws are closed, the pivoted arm 76 will move to the position shown in the dotted lines 81.

Figure 5:
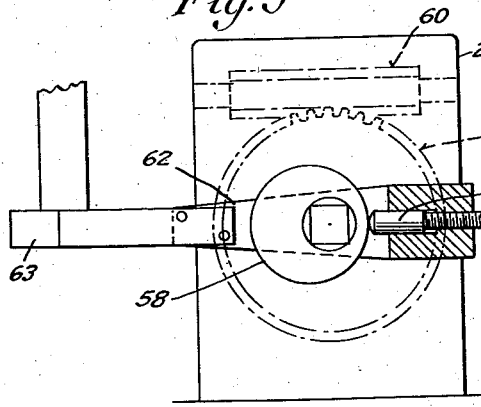
Fig. 5 is a vertical elevation, partially in section, of a modified form of the invention showing an automatic means to operate the same.

Alternatively, the machine may be operated automatically by provision of an eccentric or cam 58 (Fig. 5), said cam being rotated by means of worm wheel 59 and worm 60. Said cam can be designed to engage an adjustable pin 61 mounted on slide 62, the slide being movable longitudinally on the base of the machine in a manner similar to that described for the rack. The slide has cams 63 mounted on the end thereof similar to the cams described for Figs. 1 to 4 inclusive. The slide and cams may be started in operation manually or operated automatically in any desired fashion.

Figure 6:
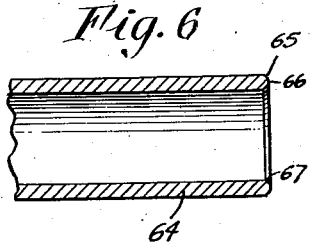
Fig. 6 is a sectional view of an end of a trimmed piece of tubing showing the surfaces which may be cut by the device.

In Fig. 6 will be found an example of one type of work which may be done with the machine wherein a tube 64 has an outside chamfer 65, trimmed end 66, and inside chamfer 67.

Various modifications may be made, such as having the carriage stationary and allowing the housing and tool to move toward the carriage, without departing from the spirit of the invention or the scope of the appended claims.

I claim:

1. In a machine of the character described, the combination comprising a tool; a work clamp for movement toward and away from said tool and movable to and from work to be clamped thereby; an operating member having a portion movable toward said tool, said portion engaging the work clamp, relative movement between said portion and work clamp toward the tool causing work engaging movement of the clamp and after said work engagement, movement of the clamped work toward the tool; and yieldable means to restrain movement of said clamp relative to said tool until said work has been firmly clamped.

2. In a machine of the character described, the combination comprising a tool; a pivoted work clamp for movement toward and away from said tool and movable to and from work to be clamped thereby; an operating member having a portion movable toward said tool, said portion engaging said pivoted work clamp, relative movement between said portion and work clamp toward the tool causing work engaging movement of the clamp and after said work engagement, movement of the clamped work toward the tool; and yieldable means to restrain movement of said work toward said tool until said work has been firmly gripped.

3. In a machine of the character described, the combination comprising a tool; a pivoted work clamp for movement toward and away from said tool and movable to and from work to be clamped thereby, the work clamping movement thereof being in a plane angularly disposed to the direction of movement of the clamp relative to said tool; an operating member having a portion movable toward said tool, said portion engaging the work clamp, relative movement between said portion and work clamp toward the tool causing work engaging movement of the clamp and after said work engagement, movement of the clamped work toward the tool; and yieldable means to restrain movement of said clamp relative to said tool until said work has been firmly clamped.

4. In a machine of the character described, the combination comprising a tool; a guide; a work clamp pivoted on said guide for movement toward and away from said tool and movable to and from work to be clamped thereby, an operating member having a portion movable toward said tool, said portion engaging the work clamp, relative movement between said portion and work clamp toward said tool causing work engaging movement of the clamp and after said work engagement, movement of the clamped work toward the tool; and yieldable means to restrain movement of said clamp relative to said tool until said work has been firmly clamped.

5. In a machine of the character described, the combination comprising a tool; a guide; a pair of work clamps pivoted on said guide and movable toward and away from said tool and movable to and from work to be clamped; an operating member having a cam movable toward said tool, said cam engaging the work clamps, relative movement between said cam and work clamps toward the tool causing work engaging movement of the clamps and after said work engagement, movement of the clamped work toward said tool; a rack and pinion for reciprocating said operating member; and yieldable means to restrain movement of said clamp relative to said tool until said work has been firmly clamped.

6. In a machine of the character described, the combination comprising a tool; a work clamp for movement toward and away from said tool and movable to and from work to be clamped thereby; an operating member having a portion movable toward said tool, said portion engaging the work clamp, relative movement between said portion and work clamp toward the tool causing work engaging movement of the clamp and after said work engagement, movement of the clamped work toward the tool; and spring means restraining movement of said clamp relative to said tool until said work has been firmly clamped so that the gripping force exerted on a piece of work of greater than a predetermined minimum size is increased as the clamp and tool are moved relative to each other.

7. In a machine of the character described, the combination comprising a tool; a pivoted work clamp movable relatively toward and away from said tool, the clamping movement being in a plane angularly disposed to the direction of the movement of the clamp relative to said tool; operating means movable relative to said clamp to close said clamp on a piece of work and after said closing to move said clamped work into operating engagement with said tool; and yieldable means to restrain movement of said clamp relative to said tool until said work has been firmly clamped.

8. In a machine of the character described, the combination comprising a tool means; a work clamp movable toward said tool; a work stop between said work clamp and tool for positioning a piece of work in said clamp relative thereto; operating means to first clamp work and thereafter move said clamped work toward and into engagement with said tool means; and means responsive to movement of said clamp relative to said tool to move said work stop from in front of the piece of clamped work as said work is moved toward said tool.

9. In a machine of the character described, the combination comprising a tool; a work clamp movable toward said tool; a work stop between said work clamp and tool for positioning a piece of work in said clamp relative thereto, said stop being carried by said clamp; operating means to first clamp work and thereafter to move said clamped work toward and into engagement with said tool means; and means responsive to movement of said clamp relative to said tool to rotate said work stop from in front of said work piece.

10. In a machine of the character described, the combination comprising a rotatable head adapted to carry tools therein; a guide; a pair of pivoted work clamps carried on said guide and movable bodily toward and away from said rotating tool head; a work stop between said work clamps and tool for positioning a piece of work in said clamps relative thereto, said work stop being rotatably mounted in one of said clamps; operating means having a cam for first pivoting said clamps into work clamping position and thereafter moving said clamped work into operative engagement with said tool; and means responsive to movement of said clamp relative to said tool engageable with said work stop to rotate the stop from in front of a piece of clamped work as said work is moved toward said tool.

11. In a machine of the character described, the combination comprising a tool; a pair of pivoted work clamps movable relatively toward and away from said tool; operating means for closing said clamps into work clamping position and for thereafter moving clamped work into operative engagement with said tool; a work stop between said work clamp and tool for positioning a piece of work relative to said clamps, said stop being rotatably mounted in one of said clamps; and a pivoted arm having means thereon to engage said work stop and rotating the same as the work stop is moved with said clamps toward said tool.

JAMES R. HUNTLEY.